Patented Mar. 27, 1923.

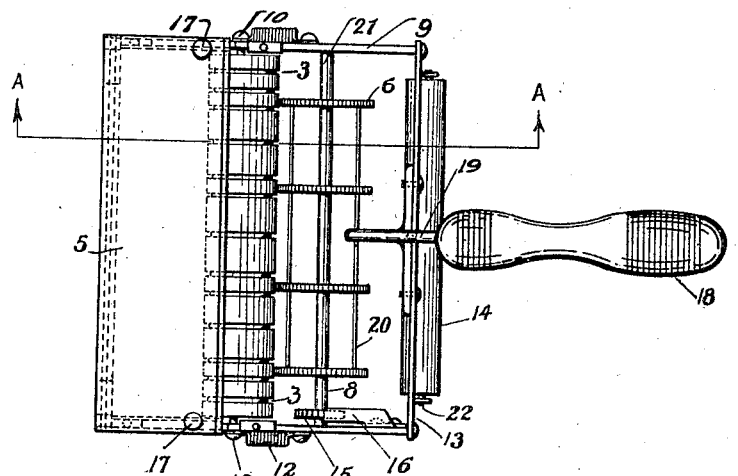
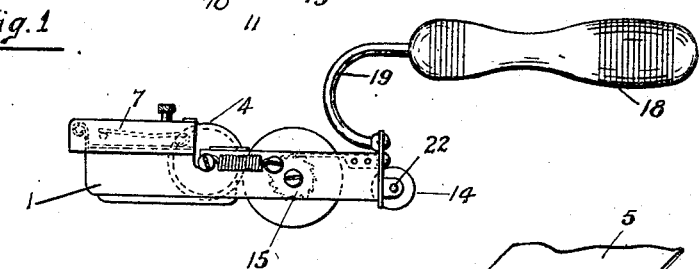
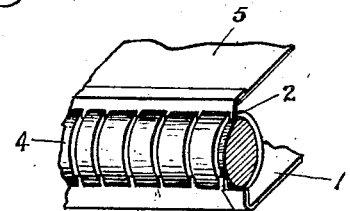
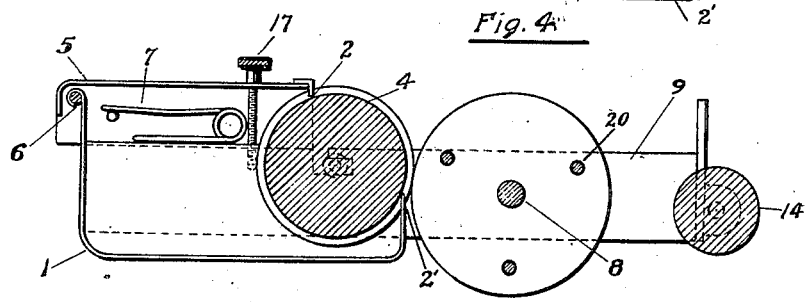

1,449,495

UNITED STATES PATENT OFFICE.

LOUIS CASPER, OF BROOKLYN, NEW YORK.

MACHINE FOR PASTING AND ATTACHING LABELS.

Application filed February 23, 1921. Serial No. 447,109.

*To all whom it may concern:*

Be it known that I, LOUIS CASPER, a citizen of the United States, residing in the borough of Brooklyn, in the county of Kings and State of New York, have invented a new and useful and Improved Machine for Pasting and Attaching Labels, of which the following is a specification.

The invention is more particularly designed as an improvement upon that disclosed in Patent No. 866,774 granted to me September 24, 1907, and its object is to render the invention more efficient and positive and also more saving of gum or paste material which is used in connection with my invention.

A practical embodiment of my invention is represented in the accompanying drawings, in which—

Figure 1 is a top plan view of the machine. Fig. 2 is a side view of the same machine. Fig. 3 is a detail section through line A, A of Fig. 1. Fig. 4 is a detail section showing scraper projections on the paste or liquid receptacle cover and scraper projections at the lower part of the paste receptacle afterward to be described.

The receptacle or box in which the liquid solution of gum is contained is denoted by 1.

The lower edge of this receptacle has a series of projections or teeth 2' which fit into grooves 3 of roller 4. The paste or liquid feed roller 4 revolves in the paste or liquid receptacle 1 and thus picks up any paste, gum or other liquid that may be in the receptacle when the said roller is revolving.

Above the receptacle 1 is a cover 5 which is hinged at 6 and is retained in a closed downward position by two springs 7 at each end of the cover 5. The lower part of spring 7 is permanently soldered to the upper edge of the paste or liquid receptacle 1 while the upper prong thereof presses downward upon a projecting pin which is attached to the cover 5. Other methods for holding the cover 5 in a closed downward position may be employed, the particular kind of tension employed not being pertinent to my invention. The cover 5 is provided with projections 2 on the lower edge of the paste receptacle 1. The cover 5 is provided with projections 2 corresponding with projections 2' on the lower edge of the paste receptacle 1.

The disc wheels 6 are in frictional contact with the roller 4, and are supported by a shaft 8 with end bearing 21 in frame 9. 20 are reinforcing rods arranged so that the disc wheels will maintain a perfect alignment with respect to each other also in positive though yielding contact with the paste or liquid feed roller 4.

The roller 4 has a journal 10 at each end of the same. These journals bear in a sliding groove 11. Two coiled springs 12 are attached to the journals 10 of the paste or liquid feed roller and are also attached at the opposite end of the spring to the frame 9 which is rigid. These springs have a tendency to pull the paste or liquid feed roller into yielding though even contact with the disc wheels 6.

The label which is to be pasted (or in the case of a gummed label to be moistened) and attached to a package is caught in the bight between the paste roller 4 and the disc wheels 6 when the said disc wheels revolve.

13 is a crosspiece and is an integral part of the supporting frame 9. The crosspiece 13 supports the smoothing roller 14 which revolves in bearing 22.

15 is a ratchet wheel attached to shaft 8 and 16 is a ratchet spring which bears on the teeth of said ratchet wheel.

The ratchet and ratchet wheel prevent the operator of the machine from turning the disc wheels in the wrong direction, which movement must always be counter-clockwise, otherwise the paste or liquid would flow from the lower exposed portion of the paste roller and cause the paste or other liquid to overflow from the lower part of the paste receptacle.

17 are guide thumb screws which bear on frame 9. These thumb screws are used to set the aperture distance between the paste receptacle cover 5 and the periphery of the paste or liquid feeding roller 4 so that the desired amount of paste or liquid can be taken up by roller 4, the said paste or liquid being exposed between the edge of the paste receptacle cover 5 and the lower edge of the receptacle 1.

18 is a handle which is grasped by the operator of the machine.

19 is a goose neck shaft which supports the handle 18 and is connected to the frame 9. The position of this handle, arranged as shown, permits a direct maximum combined downward and forward pressure on the disc wheels when the label is being moved upon the surface of a package or the like. This arrangement of handling the device is more desirable than that disclosed in my existing patent, in that the manipulation of the machine would be more inclined to involve the muscles of the forearm and would thus reduce considerably the strain upon the wrist, when the device is operated continuously for any length of time.

Referring again to Fig. 4. The cover 5 and the lower edge of the paste or liquid receptacle are each provided with a series of projections 2 and 2′ which extend into the grooves 3 of the roller 4.

The projections 2′ in the lower part of the paste or liquid receptacle 1 by extending into the grooves 3 of the roller 4, effectively and positively prevent the label that is fed into the bight between the disc wheels and the roller 4 from being carried by said roller into the space between the periphery of the same and the lower part of the paste or liquid receptacle and carried into the receptacle itself. The projections 2′ form a series of guides which compel the label to follow the disc wheels and from thence to the surface of the package.

The projections extending from the cover 5 into the grooves 3 of the roller 4 prevent an excess of paste or liquid from being carried in the grooves of the same, which would be the case if such projections were not provided. The amount of paste or liquid carried by the periphery of the paste roller is quite sufficient and, therefore, any paste or liquid in the grooves of said paste roller is unnecessary.

The grooves in the roller 4 have an additional and important value in that the roller only picks up such amounts of paste or liquid as adhere to the periphery of the roller. The spaces caused by the grooves are left clear of paste or excess of liquid through the scraping effect of the projections 2 on the reservoir cover extending into the same.

The corresponding spaces, therefore, are also clear of paste or liquid on the under side of the label in its travel between the paste roller and the disc wheels. When the smoothing roller 14 is applied by pressing the latter on the label when it is on a package, the paste or liquid on the underside of the label is inclined to spread, and this spreading of the paste or liquid covers the gaps occasioned by the presence of grooves in the roller.

If a solid roller were to be employed, there would be a tendency of the paste or liquid to spread beyond the confines of the label and onto the package itself.

The arrangement as disclosed in my existing patent, did not accomplish this as efficiently as the arrangement just described.

The operation of the device is as follows:

The machine is grasped by the handle 18 and placed on the package or surface about to be labelled. A label is placed with the printed or marked side uppermost in the bight between the disc wheels and the paste or liquid roller. The machine is then pushed forward and simultaneously, pressure is exerted gently with the machine on the package or surface, the pressure being confined purely to the disc wheels. This causes the disc wheels to revolve and to carry with them the label which receives the paste or liquid on its underside from the paste or liquid feed roller. The label is then carried by the disc wheels onto the package. The label, being supplied with a layer of paste or liquid on its under side from contact with the roller 4, adheres to the package or surface. The machine is then moved back the length of the label or thereabouts that has just been pasted on the package or surface and is then tilted, sufficiently to clear the disc wheels from the package or surface. This movement places the smoothing roller 14 on a line with the pasted label. The smoothing roller is then rolled over the label which smooths down the same and enables the label to better adhere to the package or surface. This completes the operation.

It will be seen that this machine can be modified without departing from the spirit of my invention.

For instance, a sponge moistened with water may be used in the paste receptacle in lieu of paste to use with labels that are already gummed and only require moistening. The roller 4 which bears on sliding groove 11 can be readily removed from the same by unhooking the coiled spring 12 and raising the cover 5.

Having thus described my invention, I claim:

1. A device for applying paste or a liquid to labels and attaching the latter to surfaces in which is combined a reservoir containing a paste or liquid supply, a grooved roller arranged to receive paste or liquid therefrom, a series of wheels with which said roller is held under resilient pressure behind said roller for primarily engaging therewith as well as the surface to which the label is to be attached, to cause the label to first move between said roller and said series of wheels and a series of teeth or the like extending from said paste or liquid reservoir that project into grooves of the roller which acts as a guide directing rearwardly the label that is about to be attached to a surface beneath said series of wheels substantially as described.

2. A device for applying paste or a liquid to labels and attaching the latter to surfaces in which is combined a reservoir containing a paste or liquid supply, a cover therefor;

a grooved roller arranged to receive paste or liquid therefrom, a series of wheels with which said roller is held under resilient pressure; means for adjusting the space between the paste reservoir cover and the roller for the purpose of feeding the proper amount of paste or liquid onto said roller and a series of teeth or the like extending from said paste or liquid reservoir that project into grooves of the roller which acts as a guide by directing the label that is about to be attached to a surface rearwardly beneath said series of wheels substantially as described.

3. A device for applying paste or a liquid to labels and attaching the latter to surfaces said device combining a paste or liquid reservoir, a grooved roller arranged to receive paste or liquid therefrom and a series of wheels; said roller bearing in a sliding groove and being held in position by means of a spring tension against said series of wheels which together with a series of projections or teeth extending from the paste or liquid reservoir into the grooves of the aforesaid roller will cause a label to move rearwardly underneath said series of wheels, substantially as described.

4. A device for applying paste or liquid to labels and attaching the latter to surfaces, said device combining a paste or liquid receptacle, a roller to partially enter therein, a series of wheels and a handle to operate said device; said roller held in resilient engagement primarily with said series of wheels by means of a spring arrangement situated between each end of the shaft of the aforesaid roller and a movable frame that supports both the handle and said series of wheels, substantially as described.

5. A device for applying paste or a liquid to labels and attaching said labels to surfaces consisting of a paste or liquid receptacle, a grooved roller arranged to enter therein, toothed projections or the like extending vertically from said paste or liquid reservoir and being tangential to the periphery of the grooves of the roller aforesaid thereby serving as a guide for a label when it is drawn in the bight between the roller and a series of wheels directing said label to move rearwardly underneath said series of wheels and upon the surface which is to be labelled; and a cover for said reservoir which also acts as a controlling medium for the quantity of paste or liquid that shall feed upon the roller aforesaid, substantially as described.

6. A device for applying paste or liquid to labels and attaching the latter to surfaces, in which is combined a source of paste or liquid supply, a roller arranged to receive paste or liquid therefrom and a series of wheels; said roller bearing in a sliding groove and held under resilient pressure against said series of wheels by means of springs attached to the shaft of said roller; and means for exterting by hand a direct simultaneous downward and forward pressure on the aforesaid series of wheels, substantially as described.

LOUIS CASPER.

Witnesses:
A. ELLWELL POWERS,
GEORGE E. PALMER.